US011330775B2

United States Patent
Le Berre

(10) Patent No.: US 11,330,775 B2
(45) Date of Patent: May 17, 2022

(54) METHOD FOR THE SEQUESTRATION OF CARBON DIOXIDE USING PLANT BIOMASS AND ASSOCIATED USE

(71) Applicant: Thomas Le Berre, Vannes (FR)

(72) Inventor: Thomas Le Berre, Vannes (FR)

(73) Assignee: Thomas LeBerre, Vannes (FR)

( * ) Notice: Subject to any disclaimer, the term of this patent is extended or adjusted under 35 U.S.C. 154(b) by 685 days.

(21) Appl. No.: 16/308,717

(22) PCT Filed: Jun. 8, 2017

(86) PCT No.: PCT/EP2017/064001
§ 371 (c)(1),
(2) Date: Dec. 10, 2018

(87) PCT Pub. No.: WO2017/211976
PCT Pub. Date: Dec. 14, 2017

(65) Prior Publication Data
US 2019/0141925 A1 May 16, 2019

(30) Foreign Application Priority Data
Jun. 10, 2016 (FR) .................................... 1655349

(51) Int. Cl.
A01G 33/00 (2006.01)
A01G 15/00 (2006.01)
A01G 31/00 (2018.01)
B01D 53/84 (2006.01)

(52) U.S. Cl.
CPC ............. *A01G 33/00* (2013.01); *A01G 15/00* (2013.01); *A01G 31/00* (2013.01); *B01D 53/84* (2013.01); *Y02P 60/20* (2015.11)

(58) Field of Classification Search
CPC ......... A01G 33/00; A01G 31/00; B01D 53/84
See application file for complete search history.

(56) References Cited

U.S. PATENT DOCUMENTS

| 4,209,943 | A | * | 7/1980 | Moeller | ................... | A01G 9/18 |
| | | | | | | 47/1.4 |
| 6,056,919 | A | | 5/2000 | Markels, Jr. | | |
| 7,975,651 | B2 | | 7/2011 | Lutz | | |
| 2013/0266380 | A1 | * | 10/2013 | Capron | ..................... | F16L 1/24 |
| | | | | | | 405/184.4 |

FOREIGN PATENT DOCUMENTS

| CN | 101742902 A | | 6/2010 |
| CN | 107902761 A | * | 4/2018 |
| EP | 2141980 A1 | | 1/2010 |
| JP | 2006204264 A | | 8/2006 |
| TW | 201244992 A1 | | 11/2012 |
| WO | 00065902 A1 | | 11/2000 |
| WO | 2008/131472 A1 | | 11/2008 |
| WO | 2008131472 A1 | | 11/2008 |

OTHER PUBLICATIONS

International Search Report and Written Opinion for PCT/EP2017/064001 dated Aug. 23, 2017 [Translation].
Anonymous; "Eichhornia crassipes", From Wikepedia, May 7, 2015, XP002767478, Retrieved from Internet: https://web.archive.org/web/20150507151508/http://en.wikipedia.org/wiki/Eichhornia crassipes [retrieved Jan. 14, 2019].
India Examination Report, dated Sep. 29, 2021, Application No. 201817047215.

* cited by examiner

*Primary Examiner* — Monica L Barlow
(74) *Attorney, Agent, or Firm* — Thomas | Horstemeyer, LLP

(57) ABSTRACT

Method of sequestration of carbon dioxide characterized in that it comprises:
a step of production of at least one macrophyte plant species floating on an expanse of fresh water in order to form a raft of plant biomass;
a step of transportation of said raft of plant biomass from said expanse of fresh water to a sea;
a step of dispersal and decomposition of said raft of plant biomass on an expanse of said sea;
at least one of said step of production, said step of transportation and said step of dispersal and decomposition being carried out with human assistance.

8 Claims, No Drawings

METHOD FOR THE SEQUESTRATION OF CARBON DIOXIDE USING PLANT BIOMASS AND ASSOCIATED USE

CROSS-REFERENCE TO RELATED APPLICATION

This application is the 35 U.S.C. § 371 national stage application of PCT Application No. PCT/EP2017/064001, filed Jun. 8, 2017, where the PCT claims the priority to and benefit of French Patent Application No. 1655349, filed Jun. 10, 2016, both of which are herein incorporated by reference in their entireties.

FIELD OF THE INVENTION

The present invention relates to the field of the sequestration of carbon dioxide using plant biomass.

PRIOR ART

Carbon dioxide is a greenhouse gas responsible for climatic warming. Its concentration in the atmosphere has considerably increased because of the ever-increasing use of fossil-fuel energy for mankind's energy needs.

The oceans represent the planet's most important carbon sink in that they are capable of absorbing major quantities of carbon dioxide from the atmosphere, especially through the dissolving of carbon dioxide in the form of bicarbonate ($HCO_3^-$) ions and through the growth of phytoplankton and more generally of biomass. Phytoplankton develops on the surface of the oceans at depths where sunlight is still accessible, also called the photic zone or sunlight zone, and uses carbon dioxide for photosynthesis. It is needed for the growth of marine biomass since it is the first link in the marine food chain and produces dioxygen. Long-term storage of carbon takes place especially when dead biomass sinks to the bottom of the ocean. Indeed, it is estimated that the thermohaline cycle can take 1000 to 1500 years for one molecule of water.

However, several phenomena of anthropomorphic origin are tending to cause a reduction in the absorption by the oceans of carbon dioxide from the atmosphere. On the one hand, the acidification of oceans is reducing the solubility of carbon dioxide in the form of bicarbonate ($HCO_3^-$) ions. More specifically, it has been estimated that, between the years 1751 and 2004, the pH of surface water on the oceans went from an average of 8.25 to an average of 8.14. On the other hand, human overexploitation of fishing resources has led to the depletion of nutrients and phytoplankton in the photic zone.

Various prior art techniques have been developed to sustainably sequester carbon dioxide by plant biomass. The US patent document U.S. Pat. No. 6,056,919 especially describes a method for fertilizing a surface area of the ocean by the addition of iron complexes, or even other substrates containing especially nitrogen or phosphates in order to prompt the development of phytoplankton and therefore the absorption of carbon by this phytoplankton and by the biomass consuming this phytoplankton. One drawback of this method is the overconcentration of nutrients brought about by fertilization on an area of limited expanse. Another drawback is that the fertilizing material requires, a priori, the conversion and conditioning of certain raw materials. Besides, the document US 2004/0161364 describes especially a method of carbon sequestration by the elimination of plant biomass from fresh water or sea water in a zone to be treated by using an aquatic herbicide/algaecide. One drawback of this method is that aquatic herbicides/algaecides are relatively costly and present a risk for the environment.

Other drawbacks, common to both these methods, especially comprise a large carbon footprint since the need to use a boat and the high localized concentration of organic waste at the bottom of the treated area could have a harmful impact on communities living at the bottom of the areas being treated.

Goals of the Invention

It is a goal of the invention to overcome at least one of the drawbacks mentioned here above.

More specifically, it is a goal of the invention to propose a method for the sequestration of carbon dioxide enabling the distribution, over a large expanse, of biomass organic wastes at the bottom of the ocean.

It is another goal of the invention to propose a method of sequestration of carbon dioxide enabling the distribution of nutrients over a large expanse of the photic zone of the oceans.

It is another goal of the invention, in at least one embodiment, to propose a method of sequestration of carbon enabling the distribution of trace elements over a large expanse of the photic zone of the oceans.

It is another goal of the invention to propose a simple and low-cost method of sequestration of carbon dioxide.

It is another goal of the invention to propose a method of sequestration of carbon dioxide having a small carbon footprint.

It is another goal of the invention to propose a method of sequestration of carbon that respects the environment.

It is another goal of the invention, in at least one embodiment, to propose a method of sequestration of carbon enabling the growth/restoration of plant biomass and/or animal biomass in the oceans.

DESCRIPTION OF THE INVENTION

The inventor has made use of the idea, well known in the prior art, of sequestering carbon dioxide by making biomass sink to the sea bed. The inventor has also made use of the idea, well known in the prior art, of sequestering carbon dioxide by the distribution of nutrients in a photic zone to enable the growth of phytoplankton and more generally of the biomass. He has wholly unexpectedly combined several steps that bring into play natural phenomena and natural forces to obtain a method of sequestration of carbon that does not show the disadvantages of the prior art. The invention in particular makes use of the phenomenon of the natural capture of carbon dioxide and other nutrients by the plant biomass. The invention also makes efficient use of the forces of currents and winds to transport a floating body and make it drift. Finally, the invention makes use of the fact that sea water is toxic for fresh-water plant species. According to the invention human assistance is needed in at least one of the steps of the method claimed in order to prompt certain natural phenomena or to control certain forces of nature with a view to attaining a precise goal or again with a view to optimizing its effects.

Although the method according to the present invention relates to the sequestration of carbon, it can also be used to enable the growth/restoration of marine fauna and especially fish and mollusks and crustaceans (shellfish). This method thus also finds application in the field of the fertilization of oceans.

DETAILED DESCRIPTION OF THE INVENTION

The present invention is aimed at providing a method of sequestration of carbon dioxide. This method comprises:
a step of production of at least one macrophyte plant species floating on an expanse of fresh water in order to form a raft of plant biomass;
a step of transportation of said raft of biomass from said expanse of fresh water to a sea;
a step of dispersal and decomposition of said raft of biomass on an expanse of said sea;
at least one of said step of production, said step of transportation and said step of dispersal and decomposition being carried out with human assistance.

The term "floating macrophyte" is understood to mean an aquatic plant species visible to the naked eye, having a size at least of the order of one millimeter, floating on the surface of the water. If the plant species has roots, these roots are free in the water. A floating macrophyte plant species can therefore move freely on the surface of the water according to the wind and/or the current.

As understood in the invention, the term "floating macrophyte" also includes certain aquatic plant species that are normally called "emerged leaf macrophytes", i.e. species that are normally capable of getting rooted in a substrate and have leaves that float on the surface of the water but, if uprooted, continue to grow with their roots free in the water.

Said at least one floating macrophyte plant species is chosen from among: *Azollafiniculoides, Ceratopteriscornuta, Ceratopterispteridoides, Ceratopteristhalictroides, Eichhorniacrassipes, Eichhorniaazurea, Eichhorniadiversifolia, Eichhornianatans, Eichhorniapaniculata, Heterantheradubia, Heterantheralimosa, Heterantheramexicana, Heterantheramultiflora, Heterantherapenduncularis, Heterantherarotundifolia, Heterantherareniformis, Hydrocharismorsus-ranae, Hygroryzaaristata, Lemnabiloba, Limnobiumlaevigatum, Limnobiumspongia, Myriophyllumaquaticum,* water lily species such as *Nymphaea, Nupharlutea, Pistiastratiotes, Pontederiacordata, Ranunculusaquatilis, Salviniaauriculata, Trapabicornis* and *Trapanatans*.

The term "fresh water" is understood to mean water with low salinity, i.e. having a concentration in salts typically ranging from 0 to 0.5 grams per liter of water. Fresh water in particular has a low concentration in sodium chloride salt. On the contrary, "sea water" is water with high salinity. It generally has a salt concentration on the surface, especially sodium chloride salt, ranging from 30 to 40 grams per liter of water. However, there are wide differences in values of salinity depending on the seas. Indeed, the Baltic Sea is considered to be one of the world's least saline seas with salinity of about 5 grams of salt per liter of water while the Black Sea is considered to be one of the world's most saline seas with salinity of about 275 grams of salt per liter of water.

"Human assistance" is understood to mean any action by human beings aimed at a particular goal in order to modify a natural order. As could be understood from a reading of the detailed description of the different steps of method according to the invention, each step could, in at least one particular embodiment, require human assistance. Besides, in all the embodiments of the invention, at least one of the steps of the method according to the invention requires human assistance. Human assistance can in certain cases consists of the prompting of a natural phenomenon which would not have taken place without action by a human being. Human assistance in other cases can consist of control over natural forces with a view to a precise goal. Human assistance can in yet other cases consists of the optimizing of the effects of natural phenomena and/or natural forces.

The step for producing at least one floating macrophyte plant species on an expanse of fresh water has the purpose of capturing, through said at least one floating macrophyte plant species, carbon dioxide from the atmosphere as well as other nutrients dissolved in said expanse of fresh water. Expanses of fresh water suited to achieving the present invention are for example: a pool, a natural fresh-water lake, an artificial fresh-water lake, a branching of fresh-water rivers, canals or any specific structure suited to implementing the present invention. A structure suited to implementing the present invention includes: basins in effluent-treatment stations, aquaculture ponds, greenhouse basins and rice paddies reconverted for this purpose. Depending on each case, the expanse of fresh water chosen is naturally rich in nutrients needed for the growth of said at least one floating macrophyte plant species.

The step for producing at least one floating macrophyte plant species on an expanse of fresh water comprises at least one first step for identifying an expanse of fresh water suited for the production of at least one floating macrophyte plant species. According to one particular embodiment, the step for identifying corresponds solely to a visual observation of said expanse of fresh water. For example, it can be observed that an expanse of fresh water already has floating macrophyte plant species or, on the contrary, it can be observed that an expanse of fresh water has no floating macrophyte plant species whatsoever. According to another embodiment, the step for identifying further comprises the taking of measurements of pH value and/or the chemical analysis of samples of water taken from said expanse of fresh water.

The step for producing at least one floating macrophyte plant species on an expanse of fresh water comprises, optionally, a second step for the introduction of at least one floating macrophyte plant species into said expanse of fresh water, said at least one floating macrophyte plant species being capable of being introduced in the form of seeds or plants for species capable of stolonization. This second step can especially be optional if it has been identified that a floating macrophyte plant species is already naturally present in said expanse of fresh water.

The step for producing at least one floating macrophyte plant species on an expanse of fresh water comprises, optionally, a third step for the addition of nutrients necessary for the growth of said at least one floating macrophyte plant species in said expanse of fresh water. These nutrients especially include base elements constituted by nitrogen, phosphorous and potassium and secondary elements constituted by calcium, sulfur and magnesium as well as trace elements such as iron, manganese, nickel, molybdenum, copper, boron, zinc, cobalt, vanadium, silicon and selenium. The added nutrients preferably come from a source of organic waste. The addition of nutrients can be done by the addition of plant matter, waste water, purification sludges or sludges coming from aquaculture ponds or any other nutrient-rich material well known to those skilled in the art. This third step can especially be optional in the case of an expanse of fresh water that is initially nutrient-rich water, also called eutrophic water. According to one particular embodiment, a sampling and a chemical analysis of the surface water of said expanse of sea are carried out preliminarily in order to determine nutrient deficiencies in said expanse of sea. The content in silicon, iron, cadmium, zinc, nickel, copper and selenium element is measured in particular. Depending on the deficiencies observed, corresponding nutrients can be added specifically to said expanse of fresh water during said third step for the addition of nutrients.

The step for producing at least one floating macrophyte plant species on an expanse of fresh water is considered to be terminated when the plants of said at least one floating macrophyte plant species have developed sufficiently to form a raft of plant biomass. The tracking of easily measurable parameters such as size, density and surface area occupied by the plants of said at least one floating macrophyte plant species enables the characterizing of said raft of plant biomass. In the case of species normally qualified as "macrophyte with emerged leaves" that are rooted in the bed of said expanse of fresh water, the emerged leaves are then cut off from their roots.

According to one preferred embodiment of the invention, said at least one floating macrophyte plant species is chosen from the group constituted by *Eichhorniacrassipes* and *Pistiastratiotes*. *Eichhorniacrassipes*, commonly called water hyacinth is a plant species that is native to tropical and sub-tropical zones. An adult plant generally has a diameter of 30 to 80 cm. It comprises the following in terms of dry matter: 40 to 47% of carbon, about 4% of nitrogen and about % of phosphorus. *Eichhorniacrassipes* can grow in conjunction with with other floating macrophyte plant species and especially *Salvinia auriculata*, *Lemnabiloba* and *Azollafiniculoides*. *Pistiastratiotes*, commonly called water lettuce, is a plant species also native to tropical and sub-tropical zones. *Eichhorniacrassipes* and *Pistiastratiotes* are two plant species that are particularly suited to growing under external temperatures of 20° C. to 30° C. and in a fresh water expanse having a surface pH ranging from 4 to 8. In climatic areas where these two species cannot grow easily, said expanse of fresh water is preferably formed by basins of heated water such as basins of water in greenhouses or basins of water using the residual heat from industrial processes. Among the floating macrophyte plant species, these two plant species have the advantage of growing rapidly and are, besides, considered to be invasive species. It is estimated that *Eichhorniacrassipes* can produce 40 to 144 tonnes of dry matter per hectare and per year in forming biomass rafts having a density of 100 g to 400 g of dry matter per square meter. It is estimated that *Pistiastratiotes* can produce 70 tons of dry matter per hectare per year. These two plant species also have the advantage of having high floatability and a developed aerial or above-water part giving them very high lift under wind. The organic matter formed with either of these two plant species has a pH that is quite basic and is equal to about 9.

In addition, *Eichhorniacrassipes* and *Pistiastratiotes* are two plant species known as hyperaccumulators of metals and are used to purify water containing heavy metals. They are especially capable of capturing large quantities of iron, aluminum, magnesium, copper, cadmium, lead, zinc and chromium. According to one particular embodiment of the invention, this step for producing at least one floating macrophyte plant species on an expanse of fresh water comprises the production of *Eichhorniacrassipes* and *Pistiastratiotes* on an expanse of fresh water polluted with heavy metals such as iron, aluminum, magnesium, copper, cadmium, lead, zinc and chromium.

According to another preferred embodiment of the invention, said at least one floating macrophyte plant species is chosen from the group constituted by *Ranuculusaquatilis* or *Hydrocharismorsus-ranae*. *Ranuculusaquatilis*, also called water crowfoot and *Hydrocharismorsus-ranae*, also called frogbit are plant species native to temperate regions. They are particularly suited to resisting frost and grow in expanses of fresh water having neutral to basic pH. The step of transportation of said raft of plant biomass from said expanse of fresh water to a sea enables the moving of said raft of plant biomass from a habitat suited to the growth of said at least one floating macrophyte plant biomass to a habitat unsuited to the growth of said at least one floating macrophyte plant biomass, causing the destruction of its tissues.

According to one embodiment of the invention, the step of transportation of said raft of biomass from said expanse of fresh water to said sea comprises a floating of said raft of biomass along a watercourse flowing into said sea. The term "floating" is understood to mean the transportation of a raft of matter driven by the current of a watercourse with human assistance. This embodiment is particularly suited when the expanse of fresh water is naturally connected to the watercourse or sufficiently close to said watercourse so that it is possible to mechanically send said raft of plant biomass into said watercourse. This embodiment is preferred since transportation by floating has a small carbon footprint.

According to another embodiment of the invention, the step of transportation of said raft of biomass from said expanse of fresh water to said sea comprises transportation by road. This embodiment is particularly suited when the expanse of fresh water is distant from a watercourse flowing into said sea.

The step of decomposition and dispersal of said raft of biomass on an expanse of said sea enables the distribution of nutrients and causes organic wastes to sink on a large surface area of the sea. The nutrients thus distributed enable the growth of phytoplankton and more generally of biomass on a large surface area of sea thus contributing to the absorption of carbon dioxide by the oceans.

The organic wastes that sink to the bottom of the sea enable a sustainable sequestration of the carbon. The decomposition of said raft of biomass takes place through the gradual destruction of the tissues of said at least one floating macrophyte plant species by sea water. The speed of decomposition depends on the floating macrophyte plant species and on the salinity of the sea water. Several days are generally needed for said raft of biomass to get dislocated and gradually lose its floatability. For example, in the case of *Eichhorniacrassipes*, the raft of biomass remains appreciably united and floats on the surface of the sea for a period of at least three days. The dispersal of said raft of biomass is effected initially by the surface currents as well as by the winds when the organic matter that forms it floats to the surface and in a second stage by deep currents when the organic matter that forms it gradually sinks to the bottom of the sea. By comparison, any green wastes of land origin that might be shed into the water will sink rapidly and would therefore cover only a small surface area of the sea, leading to real discharges of organic waste on to the seabed. On the contrary, it is estimated that with a continuous and sustained wind and with favorable currents, the raft of biomass can reach a speed of 1 m/s. In this case, the raft of biomass which disintegrates gradually can travel a distance of 250 km before sinking. Assuming variations of 5 degrees on either side of the main wind direction, the organic matter of the raft of biomass is thus dispersed over a surface area of 5000 km$^2$.

According to a preferred characteristic of the invention, the step of transportation of said raft of biomass from said expanse of fresh water to said sea comprises a period of storage in a reservoir of fresh water close to the mouth of the water course flowing into said sea. This period of storage makes it possible to wait for certain conditions (winds, currents, tides etc.) to exist before releasing said raft of biomass into the sea in order to optimize the dispersal of said raft of biomass over a large surface of the sea, off the coasts.

According to another preferred characteristic of the invention, a step of simulation of the dispersal of said raft of biomass is carried out before the step of dispersal and decomposition of said raft of biomass. The simulation is used to determine the best conditions (winds, currents, tides etc.) for releasing said raft of biomass into the sea in order to optimize the dispersal of said raft of biomass over a large surface of the sea, off the coasts. The simulation also prevents the raft of biomass from being brought back to a coast. The parameters taken into account during the simulation are especially the geography of the environment in which raft is released, the currents, weather forecasts, the nature of the floating macrophyte plant species forming the raft of biomass as well as the salinity of the sea water. According to one particular embodiment, the simulation is carried out by computer. The method according to the invention can be used for the dispersal of nutrients on the surface of the expanse of said sea in order to develop/restore phytoplankton and more generally biomass in the photic zone of said expanse of sea. The method according to the invention can especially enable the growth/restoration of marine fauna and especially fish and mollusks and crustaceans.

According to one particular embodiment, a sampling and a chemical analysis of the surface water of said expanse of sea are preliminarily carried out in order to determine nutrient deficiencies in said expanse of sea. The mineral content in terms of silicon, iron, cadmium, zinc, nickel, copper and selenium elements is especially measured. Corresponding nutrients are added specifically into said expanse of fresh water during said step of production of at least one floating macrophyte plant species of an expanse of fresh water.

This method can also be used for the purchase of carbon credits. Indeed, the quantity of carbon sequestered can be easily evaluated from the surface and from the density in dry matter of said at least one floating macrophyte plant species of the said raft of biomass.

The invention claimed is:

1. A method for combating climatic warming by sequestration of carbon dioxide comprising the steps of:
- sampling and chemical analysis of a surface water of a given expanse of sea to determine possible nutrient deficiencies in the given expanse of sea;
- forming a raft of plant biomass in an expanse of fresh water by producing at least one macrophyte plant species floating on the expanse of fresh water;
- simulating, by a computer, a dispersal of the raft of plant biomass in the given expanse of sea to determine optimal conditions of a release of the raft of biomass into the given expanse of sea to optimize a dispersal of the raft of plant biomass, wherein the conditions of the release comprise wind, current, and tide conditions;
- transporting the raft of plant biomass from the given expanse of fresh water to the sea, taking the optimal conditions of the release into account;
- dispersing and decomposing the raft of plant biomass on an expanse of the sea.

2. The method for combating climatic warming by sequestration of carbon dioxide according to claim 1, wherein the at least one floating macrophyte plant species is chosen from the group constituted by *Azollafiniculoides, Ceratopteriscornuta, Ceratopterispteridoides, Ceratopteristhalictroides, Eichhorniacrassipes, Eichhorniaazurea, Eichhorniadiversifolia, Eichhornianatans, Eichhorniapaniculata, Heterantheradubia, Heterantheralimosa, Heteranthemexicana, Heterantheramultiflora, Heteranthera-penduncularis, Heterantherarotundifolia, Heterantherareniformis, Hydrocharismorsus-ranae, Hygroryzaaristata, Lemnabiloba, Limnobiumlaevigatum, Limnobiumspongia, Myriophyllumaquaticum*, water lily species of the type *Nymphaea, Nupharlutea, Pistiastratiotes, Pontederiacordata, Ranunculusaquatilis, Salvinia auriculata, Trapabicornis*, and *Trapanatans*.

3. The method for combating climatic warming by sequestration of carbon dioxide according to claim 2, wherein the at least one floating macrophyte plant species is chosen from the group constituted by *Eichhorniacrassipes* and *Pistiastratiotes*.

4. The method for combating climatic warming by sequestration of carbon dioxide according to claim 2, wherein the at least one floating macrophyte plant species is chosen from the group constituted by *Ranunculusaquatilis* and *Hydrocharismorsus-ranae*.

5. The method for combating climatic warming by sequestration of carbon dioxide according to claim 1, where the transporting of the raft of biomass from the expanse of fresh water to the sea comprises a floating of the raft of plant biomass along a watercourse flowing into the sea.

6. The method for combating climatic warming by sequestration of carbon dioxide according to claim 1, wherein the transporting of the raft of plant biomass from the expanse of fresh water to the sea further comprises an intermediate step of storing the raft of plant biomass in a reservoir of fresh water close to a mouth of a watercourse flowing into the sea.

7. A use of the method for combating climatic warming by sequestration of carbon dioxide according to claim 1 for dispersing of nutrients on the surface of the given expanse of the sea.

8. The use of the method for combating climatic warming by sequestration of carbon dioxide according to claim 7, wherein the nutrients are based on silicon, iron, cadmium, zinc, nickel, copper and selenium.

* * * * *